Aug. 14, 1923.                                               1,464,521
C. E. DAVIS
APPARATUS FOR HANDLING LOOSE MATERIAL
Filed April 7, 1919        6 Sheets-Sheet 1

Aug. 14, 1923. 1,464,521
C. E. DAVIS
APPARATUS FOR HANDLING LOOSE MATERIAL
Filed April 7, 1919 6 Sheets-Sheet 4

Aug. 14, 1923.

C. E. DAVIS 1,464,521

APPARATUS FOR HANDLING LOOSE MATERIAL

Filed April 7, 1919   6 Sheets-Sheet 5

Fig. 8.

Inventor.
Charles E. Davis
By Parker Carter
Atty's

Patented Aug. 14, 1923.

1,464,521

UNITED STATES PATENT OFFICE.

CHARLES E. DAVIS, OF CHICAGO, ILLINOIS, ASSIGNOR TO GOODMAN MANUFACTURING CO., OF CHICAGO, ILLINOIS, A CORPORATION OF ILLINOIS.

APPARATUS FOR HANDLING LOOSE MATERIAL.

Application filed April 7, 1919. Serial No. 288,089.

*To all whom it may concern:*

Be it known that I, CHARLES E. DAVIS, a citizen of the United States, residing at Chicago, in the county of Cook and State of Illinois, have invented a certain new and useful Improvement in Apparatus for Handling Loose Material, of which the following is a specification.

This invention relates to apparatus for handling loose material and has among other objects to provide a new and improved apparatus of this description for moving loose material from one point to another by means of a scraper and for actuating, guiding and controlling the scraper, and is particularly adapted to be used in moving coal from the room in a mine to the entry or passageway communicating therewith or to any other desired point.

Referring now to the accompanying drawings

Like numerals refer to like parts throughout the several figures.

Figure 1:
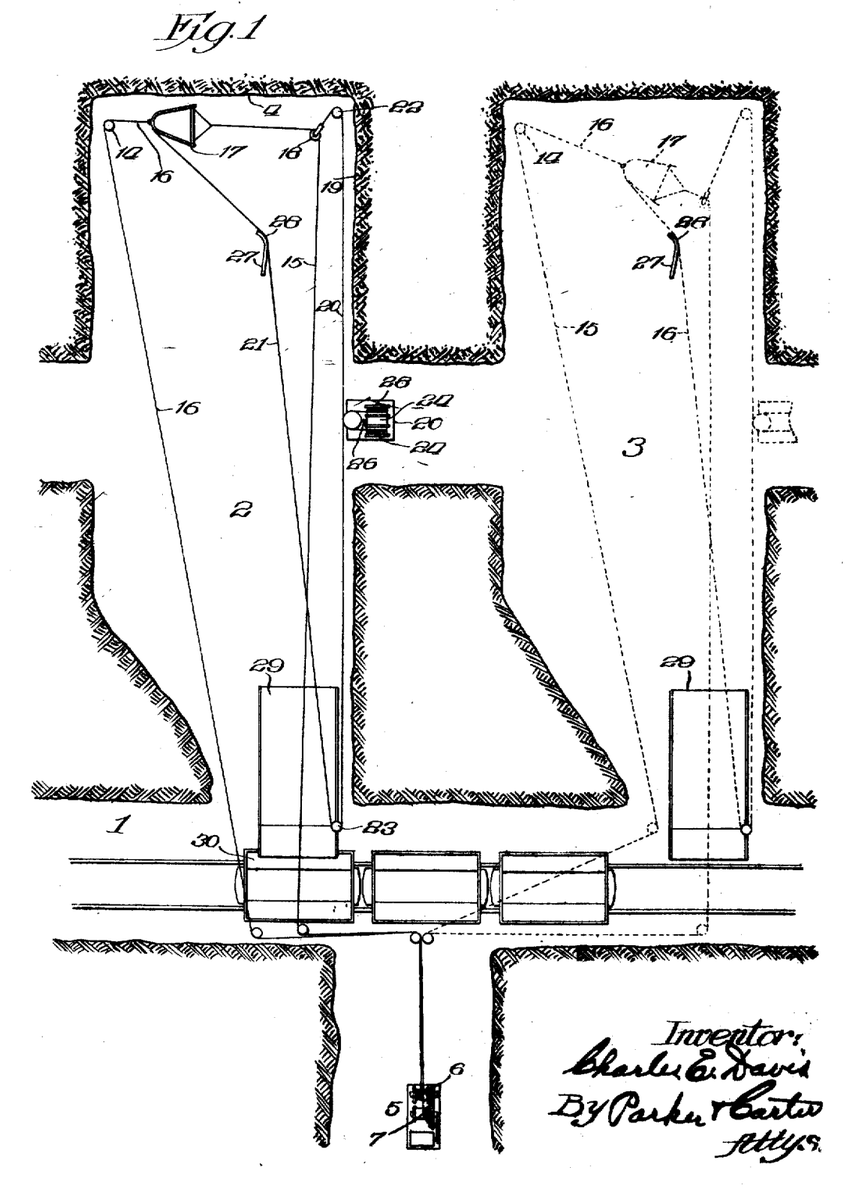
Fig. 1 is a plan view showing one construction embodying the invention.
Figure 2:
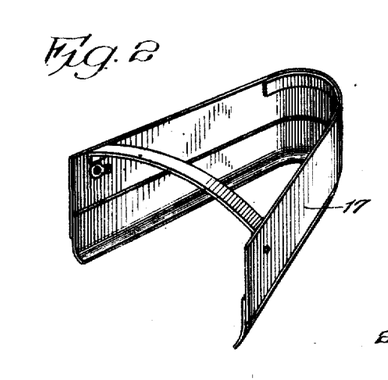
Fig. 2 is a view of the scraper.
Figure 3:
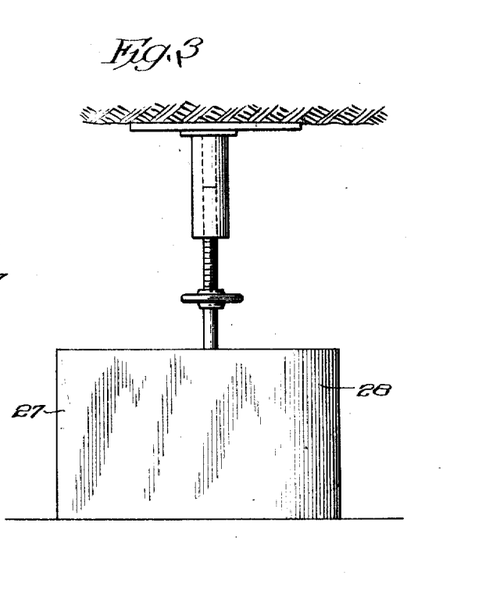
Fig. 3 is a view of the guide.

In Fig. 1 I have shown a horizontal section through a mine wherein is illustrated a plan view of one form of apparatus embodying my invention. This figure illustrates one of the common mining constructions, wherein there is an entry or passageway 1 along which are a series of rooms 2, 3, etc., from which the coal is mined, and which rooms communicate with the main passageway, the cars for carrying the coal from these rooms running on a suitable track in the passageway. The apparatus is set to operate under the conditions where the coal is mined from the face 4 of the room, such coal being shot down or otherwise removed from the face and broken up so as to be ready to be removed from the room.

In the construction illustrated I provide a motor device for acting upon the head and tail lines of the scraper to move the latter reciprocably between the working face and the entry. The particular motor device illustrated is a winding device 5 which may be of any suitable construction such as the ordinary winch. This device is illustrated in Figs. 7 to 10 and consists of two drums 6 and 7 about which portions of the head and tail lines of the scraper are wound. The drums are actuated by a suitable motor 8 which may be of any form or construction. I have illustrated this motor as an electric motor controlled by a controller $8^a$. When an electric motor is used I may provide a storage battery $8^f$ although the current may be derived from any desired source. This motor drives the shafts of the drums 6 and 7 through any desired intermediate mechanism. As shown the motor drives a short shaft $8^b$ provided with a pinion $8^c$ which drives a gear $8^d$ on the shaft $7^a$ of the drum 7, and the gear $8^d$ drives the gear $8^e$ on the shaft $6^a$ of the drum 6.

Figure 9:
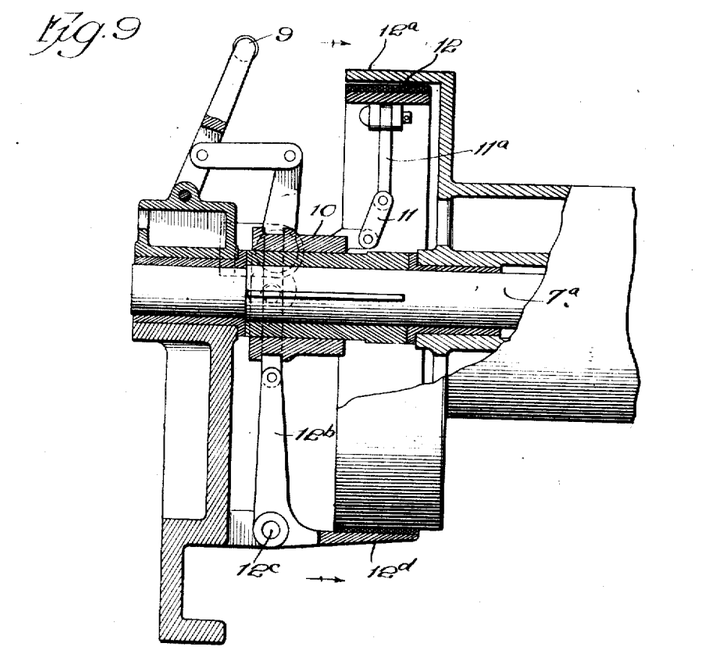
Fig. 9 is a sectional view showing one form of clutch for the winding device.
Figure 10:
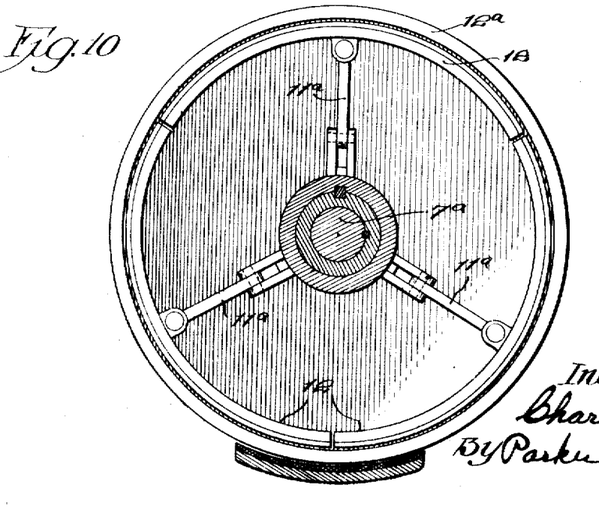
Fig. 10 is a view in part section showing one form of clutch.

It will thus be seen that the shafts of the drums 6 and 7 are rotated in opposite directions. These drums are normally disconnected from their associated shafts, but are provided with suitable clutch mechanisms so that they may be connected with the shafts when desired. In Fig. 9 I have shown one form of clutch mechanism wherein a handle 9 is pivoted to a suitable stationary part, and is connected with a sliding sleeve 10 on the drum shaft. This sliding sleeve rotates with the shaft and is connected by the parts 11 and $11^a$ with the friction clutch member 12, adapted to engage the inner face of the flange $12^a$ on the drum. There is also provided a braking lever $12^b$ which is pivoted at $12^c$ and which has a member $12^d$ which engages the outside of the flange $12^a$ when the brake is off. It will be seen that by moving the lever 9 in one direction the sleeve 10 is slid so as to straighten out the members 11 and $11^a$ and set the friction brake to cause the drum to rotate with its associated shaft. This movement also rocks the lever 12^b about the lever 12^c so as to release the brake. By moving the lever in the opposite direction the clutch is released and the brake set. The clutch and brake mechanisms for the two drums are similar and I have therefore only illustrated one in detail.

The drums 6 and 7 control the head and tail lines or cables for the scraper. A single cable may be used which passes around a direction changing device 14 near the wall 4 of the mine room. I have illustrated it as having the two branches or sections 15 and 16, the branch or section 15 being connected to the front of the scraper 17 and forming the load pulling section or head line which pulls the loaded scraper to its point of discharge, the other branch being connected to the rear end of the scraper and forming the retracting section or tail line which pulls the scraper back to its initial position.

This tail line passes around the direction changing device 14, there being preferably a pulley over which it passes to reduce the friction. The head line 15 is wound around one drum, say the drum 7, and the tail line 16 is wound around the other drum, the drum 6, the arrangement being such that when the drum 7 is rotated the head line 15 is wound thereon, the tail line 16 being unwound from the drum 6, which drum under this condition is disconnected from the driving shaft. When the drum 6 is connected to the driving shaft so as to be rotated, the tail line 16 is wound thereon and the head line 15 is unwound from the drum 7.

It will thus be seen that the winding power of one drum produces the unwinding of the other drum. The head line 15 passes about a direction changing device 18 near the point where the walls 4 and 19 of the mine meet, which direction changing device may be a pulley.

When the device is in use the scraper 17 is moved to the position shown in full lines in Fig. 1. The loose coal is now lying near the wall 4, and the scraper must be moved along the wall 19 so as to engage some of this coal and become filled with it, and then its direction must be changed so that it will move toward the passageway 1. The direction of the scraper cannot be abruptly changed, for otherwise the scraper will tip over or otherwise act so as to lose part or all of the coal, and so a gradual turn must be secured.

In order to produce this gradual turn, I provide a control line which in the present instance consists of two branches or sections 20 and 21. The section 20 passes about a direction changing device 22 located near a point where the wall 4 and 19 of the room meet and is connected with the direction changing device 18 engaged by the head line 15 of the actuating line. The direction changing device 22 may comprise a pulley about which the line 20 may pass. The line 20 also passes about a direction changing device 23 located at a distant point, preferably in or near the passageway 1, or in or near the point where the scraper is to discharge its material. This line is controlled by suitable means so as to be paid out or pulled in as desired to change the course of movement of the scraper. In the present instance the controlling means comprises the branch 21 of the control line, which is attached to the scraper 17 or to some part connected therewith. A controlling device or mechanism 20^a is associated with the control line for controlling its movement, this controlled mechanism arranged so that a control line can be held against movement when desired, and then can be moved or permitted to move to any degree or amount desired. In the arrangement illustrated the controlling device is placed in a "break through" or passageway at one side of the room, but it may be placed in any other convenient place, as desired.

Figure 4:
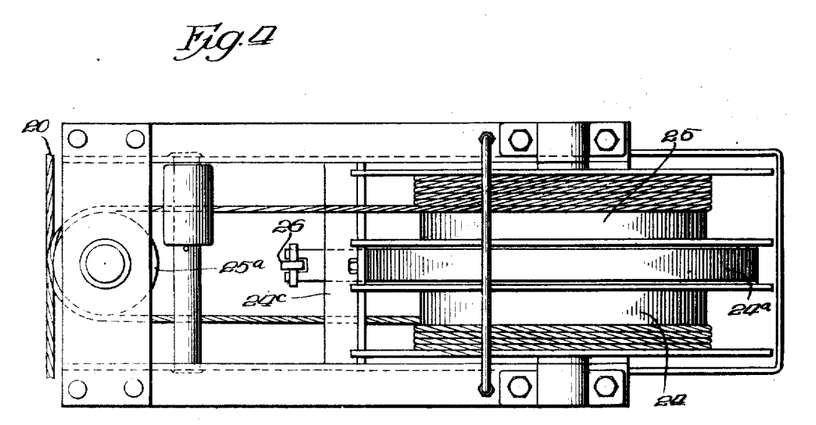
Fig. 4 is a plan view of the controlling mechanism for the control line.
Figure 5:
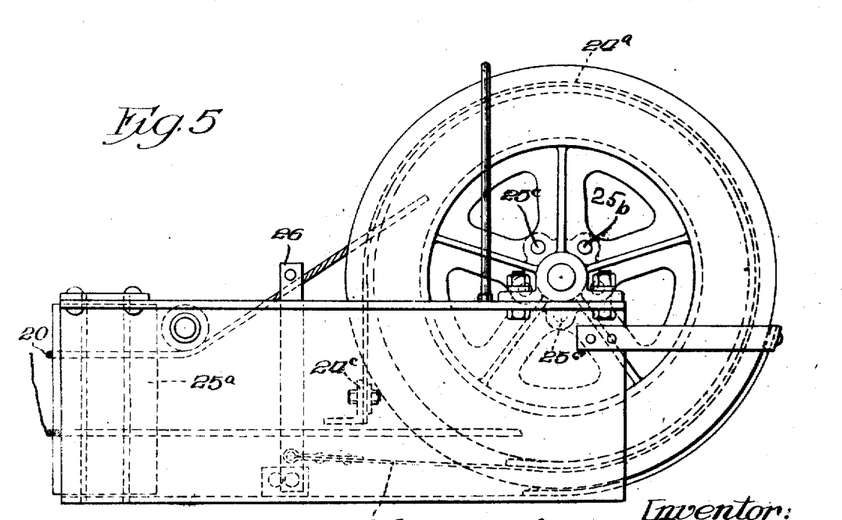
Fig. 5 is a side elevation of the device illustrated in Fig. 4.
Figure 6:
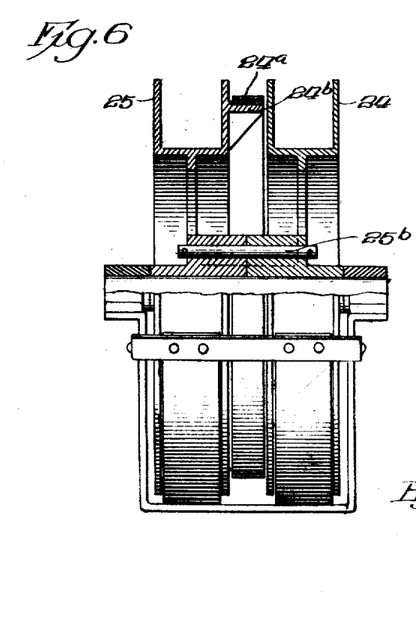
Fig. 6 is a view in part section of the drums illustrated in Fig. 4.
Figure 7:
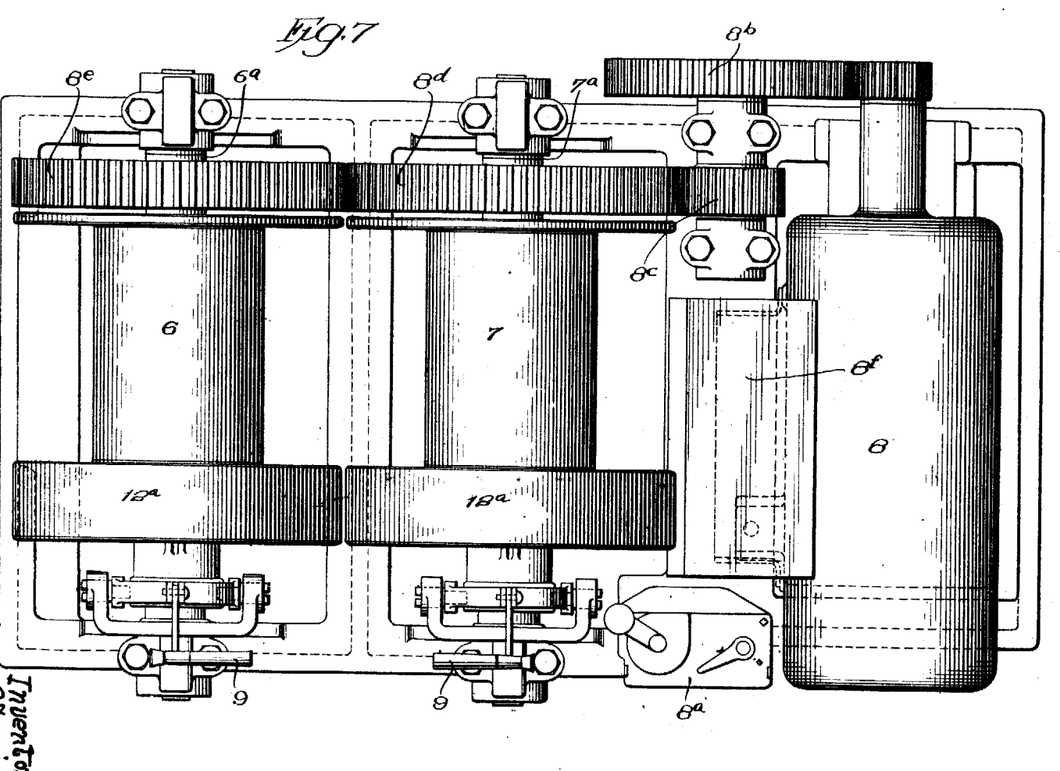
Fig. 7 is a plan view of one from of winding device for the head and tail lines of the scraper.
Figure 8:
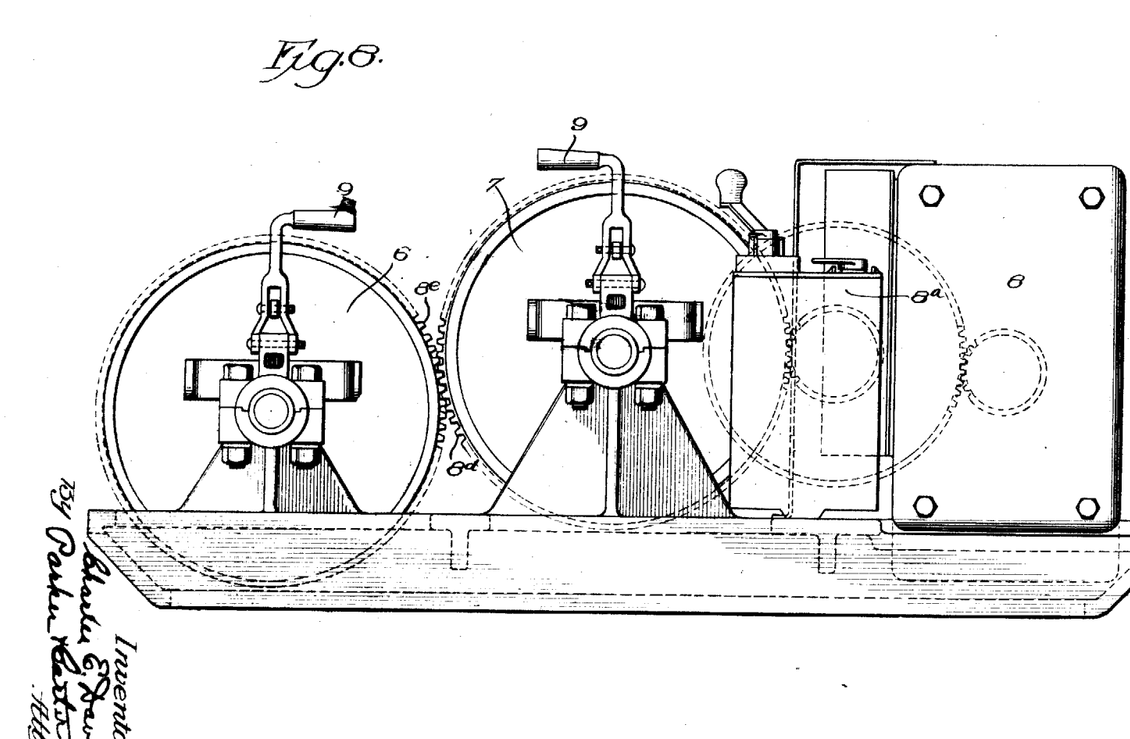
Fig. 8 is a side elevation of the winding device of Fig. 7.

Any suitable device for controlling the control line may be used and for purposes of illustration I have shown a drum and brake arrangement (see Figs. 4, 5 and 6). In this construction I provide two drums 24 and 25. The section 20 of the control line passes around an elongated pulley 25^a and a portion thereof is wound in one direction around drum 24. Another portion of the control line is wound in the opposite direction around the drum 25 and then said control line passes about the pulley 25^a.

It will thus be seen that when pressure is applied to the control line in either direction, the drums 24 and 25 will be rotated, one unwinding and the other winding thereby permitting the control line to move without varying its length. The movement of this control line is controlled by a brake on the drums. This is illustrated as an ordinary band brake having a band 24^a which passes about a brake wheel 24^b located between the two drums and connected to one of them such as the drum 25. This brake band is connected at one end to a fixed part 24^c the other end being connected to the pivoted lever 26. It will thus be seen that when the lever is moved in one direction the band will be tightened to slow down or prevent the rotation of the drums, and when moved in the other direction the band will be loosened to permit the rotation of the drums. The two drums are adjustably connected together in any desired manner, such as by means of a pin 25^b, there being a series of holes 25^c connected with said drums through which the pin may be inserted. When it is desired to lengthen or shorten the control line this pin is removed and one of the drums is rotated to wind or unwind a portion of the surplus material thereof to secure the desired adjustment and length of the control line. When the proper length is secured the pin is again placed in position. It is desirable to lengthen this line as the room is lengthened, to mine away the coal, so that the direction changing devices can be kept close to the wall 4. The scraper may be of any desired form but is preferably an open bottom scraper so that when moved over a car the material will readily be discharged into such car.

When the parts are in the position illustrated in Fig. 1 for example, and it is desired to fill the scraper with coal, the drum 7 is rotated and the controlling mechanism held to prevent movement of the section 20 of the control line. This is done by tightening the brake band 24ª. The scraper is now moved along the wall 4 toward the wall 19, the head line 15 of the line moving about the direction changing device 18.

When the scraper is full of material and it is desired to turn it toward the passageway 1, the brake lever 26 is moved the proper amount to sufficiently release the drums and the pull on the direction changing device 18, due to the pull on the head lines, causes this direction changing device to move and increase the distance between it and the direction changing device 22, thus permitting the head line 15 of the actuating line to move bodily away from the direction changing device 22, so as to vary the angle between its two branches on opposite sides of the direction changing device 18, and thus gradually turn the scraper 17 toward the passageway 1.

I have shown in dotted lines certain positions of the scraper, and the lines during this movement.

After the direction of the scraper is changed, the continued winding of the drum 7 pulls the scraper toward the passageway 1. The complete control of the scraper in this direction may be secured by a proper manipulation of the brake lever 26. I prefer, however, to provide a guide 27 which is positioned in the room at a distance from the walls 4 and 19 so as to restrict the movement of the scraper to a relatively narrow passageway along one side of the room. This is usually desirable under the mining conditions illustrated, because the major portion of the room, such as herein shown, the left and central portions of the room, 2 and 3, are usually occupied by mine props, or are used as a depository for slate, rock or the like which is separated from the coal before loading out of the room. This guide 27 may be of any suitable form and which may be held in position by suitable jacks engaging the roof of the mine and which is arranged so that the scraper or a portion of the head line 16 may be brought against it, and thus guided by it. This guiding device is preferably provided with a curved portion 28 to facilitate its action.

When the scraper nears the end of its movement it slides upon an inclined surface or plate 29 which rests upon the top of a car 30, and when the scraper is brought to the end of this plate, the material is discharged into the car as the scraper is open at the bottom.

After the material is discharged from the scraper, it is retracted to its initial position. This is accomplished by winding up the tail line 16 of the scraper line. This pulls the scraper back along a different path than that traveled by it in its forward movement. During a portion of this backward travel, the tail line 16 of the line engages the guide 27. After the scraper is moved a part of its distance toward its retracted position the scraper itself engages this guide, and then for the remainder of the movement the section 21 of the control line engages the guide. As the scraper is moved to its initial or retracted position the control line and the movable direction changing device 18 are moved. During the latter part of the retracting movement of the scraper it is turned to face the wall 19 and the direction changing device 18 is moved into proximity to the direction changing device 22 and the head line 15 of the actuating line for the scraper is brought to a position as shown in full lines in Fig. 1 where the scraper is ready to start on its loading movement. This is all done by simply winding up the tail line 16 of the scraper and without the necessity of manipulating any of the parts by hand.

The appliance is now ready to move the scraper to fill it and to then turn it and move it to its discharge position, this movement being produced as hereinbefore set out by winding up the head line 15 of the scraper, and suitably controlling or manipulating the control line.

I have described in detail a particular construction embodying the invention but it is of course evident that the construction may be varied in many particulars without departing from the spirit of the invention as set forth in the claims hereto attached and I therefore do not limit myself to the construction shown.

I claim:—

1. A device for handling loose material comprising a scraper, a head line connected therewith, a tail line connected with said scraper, means for exerting a pull upon said head and tail lines to move said scraper reciprocably, a direction changing device for the tail line, a movable direction changing device engaging the head line for changing the direction of movement of the scraper and movable with the latter during a portion of its reciprocable movement, and a controlling mechanism for said movable direction changing device.

2. A device for handling loose material comprising a scraper, a head line connected therewith, a tail line connected with said scraper, a motor device for acting upon said head and tail lines to move said scraper reciprocably, a direction changing device for the tail line, a movable direction changing device engaging the head line and movable with said scraper during a portion of its reciprocable movement, and a controlling mechanism for said movable direction changing device.

3. A device for handling loose material comprising a scraper, a head line connected therewith, a tail line connected with said scraper, means for exerting a pull upon said head and tail lines to move said scraper reciprocably, a direction changing device for the tail line, a movable direction changing device for changing the direction of movement of the scraper while being acted upon by the head line, and means responsive to the pull on said head line for moving said movable direction changing device as the scraper is moved, so as to gradually turn said scraper toward its point of discharge.

4. A device for handling loose material comprising a scraper, a head line connected therewith, a tail line connected with said scraper, a motor device connected with said head and tail lines so as to act thereupon to move said scraper reciprocably, a direction changing device for the tail line, a movable direction changing device for changing the direction of movement of the scraper while being acted upon by the head line, and means responsive to said motor device for moving said direction changing device as the scraper is moved so as to gradually turn said scraper towards its point of discharge.

5. A device for handling loose material comprising a scraper, a head line connected therewith, a tail line connected with said scraper, means for exerting a pull upon said head and tail lines to move said scraper reciprocably, a direction changing device for the tail line, a movable direction changing device engaging said head line for changing the direction of the movement of the scraper and movable with the latter during a portion of its reciprocable movement, and a control line connected with said movable direction changing device for controlling its position.

6. A device for handling loose material comprising a scraper, a head line connected therewith, a tail line connected with said scraper, means for exerting a pull upon said head and tail lines to move said scraper reciprocably, a direction changing device for the tail line, a movable direction changing device engaging said head line for changing the direction of the movement of the scraper and movable with the latter during a portion of its reciprocable movement, a control line connected with said movable direction changing device for controlling its position, and a controlling device for controlling said control line.

7. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line.

8. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, and a controlling device for controlling the movement of said control line.

9. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, and a controlling device for controlling the movement of said control line, and means associated with said control line for increasing or shortening its length.

10. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, a brake mechanism connected with said control line for controlling the movement thereof.

11. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, two drums associated with said control line about which portions of the control line are wound, said drums normally connected, to rotate together, and means for disconnecting said drums so that either one may be rotated separately to increase or decrease the length of the portion of the control line thereon.

12. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, two drums associated with said control line about which portions of the control line are wound, said drums normally connected to rotate together, and means for disconnecting said drums so that either one may be rotated separately to increase or decrease the length of the portion of the control line thereon, and a brake mechanism associated with said drums for controlling the movement thereof.

13. A device for handling loose material comprising a scraper, a head line connected therewith, a tail line connected with said scraper, a motor device for acting upon said head and tail lines to move said scraper, said head and tail lines and motor device forming an actuating system for the scraper, a control line connected in said actuating system at separated points for controlling the movement of said scraper during a portion of the time the scraper is being acted upon by said head line, a fixed guide successively engaged by the tail line of the scraper, and the control line as said scraper is moved from its unloading to its initial position.

14. A device for handling loose material comprising a scraper, a head line connected therewith, a tail line connected with said scraper, means for exerting a pull upon said head and tail lines to move said scraper reciprocably, a control line, a direction changing device for the control line, a second direction changing device connected with the free ends of the control line and engaging the head line in all positions of the latter, and means for slackening the control line to vary the position of the said second direction changing device to facilitate the turning of the scraper as it moves.

15. A device for handling loose material comprising a scraper, a head line connected therewith, a tail line connected with said scraper, means for exerting a pull upon said head and tail lines to move said scraper, reciprocably a direction changing device engaging the head line of the scraper and movable with the latter during a portion of its reciprocable movement, a control line with which said direction changing device is connected and which controls its position, said control line adapted to be payed out to permit the direction changing device to move to various positions.

In testimony whereof, I affix my signature in the presence of two witnesses this 24th day of March 1919.

CHARLES E. DAVIS.

Witnesses:
MINNIE M. LINDENAU,
DONALD M. CARTER.